United States Patent
Dober et al.

(10) Patent No.: US 10,056,743 B2
(45) Date of Patent: Aug. 21, 2018

(54) CABLE PROCESSING EQUIPMENT AND METHOD FOR REMOVING A SCREENING FILM FROM A SCREENED MULTI-CORE ROUND CABLE

(71) Applicant: Komax Holding AG, Dierikon (CH)

(72) Inventors: Urs Dober, Küssnacht (CH); Martin Stocker, Küssnacht (CH)

(73) Assignee: KOMAX HOLDING AG, Dierikon (CH)

( * ) Notice: Subject to any disclaimer, the term of this patent is extended or adjusted under 35 U.S.C. 154(b) by 304 days.

(21) Appl. No.: 15/139,473

(22) Filed: Apr. 27, 2016

(65) Prior Publication Data
US 2016/0322792 A1    Nov. 3, 2016

(51) Int. Cl.
*H02G 1/12*    (2006.01)
(52) U.S. Cl.
CPC .......... *H02G 1/1253* (2013.01); *H02G 1/127* (2013.01)
(58) Field of Classification Search
CPC ...... H02G 1/12; H02G 1/1236; H02G 1/1253; H02G 1/1256; H02G 1/1265; H02G 1/127
See application file for complete search history.

(56) References Cited

U.S. PATENT DOCUMENTS

| | | | | |
|---|---|---|---|---|
| 4,951,530 A * | 8/1990 | Cross | ............... | H02G 1/1265 81/9.42 |
| 4,972,582 A * | 11/1990 | Butler | ............... | H02G 1/127 140/139 |
| 5,414,931 A * | 5/1995 | Wollermann | ........ | H02G 1/127 30/241 |
| 5,924,200 A * | 7/1999 | College | ............ | H02G 1/127 30/90.1 |
| 8,739,665 B2 * | 6/2014 | DeGrace | .......... | H02G 1/1209 30/353 |
| 9,130,361 B2 * | 9/2015 | DeGrace | .......... | H02G 1/1209 |
| 9,520,700 B2 * | 12/2016 | Stepan | ............ | B26D 7/08 |

FOREIGN PATENT DOCUMENTS

| | | |
|---|---|---|
| DE | 154006 A1 | 12/1969 |
| EP | 0297484 A1 | 1/1989 |
| EP | 1231692 A1 | 8/2002 |
| GB | 2063580 A | 6/1981 |
| WO | 2013069247 A2 | 5/2013 |

* cited by examiner

*Primary Examiner* — David B Thomas
(74) *Attorney, Agent, or Firm* — William J. Clemens; Shumaker, Loop & Kendrick, LLP

(57) ABSTRACT

Cable processing equipment for removing a screening film from a screened multi-core round cable includes four knives radially movable relative to the cable for cutting into the screening film. In that case, each knife is associated with a cable core of the round cable. The knives have concavely formed cutting edges and guide elements, which guide elements have guide sections in which the cable cores encased by the screening film are receivable. The knives protrude relative to the guide elements in the region of the guide sections by a projection length. The guide sections have a concave circularly cylindrical shape and form a concave abutment surface for the cable cores.

14 Claims, 5 Drawing Sheets

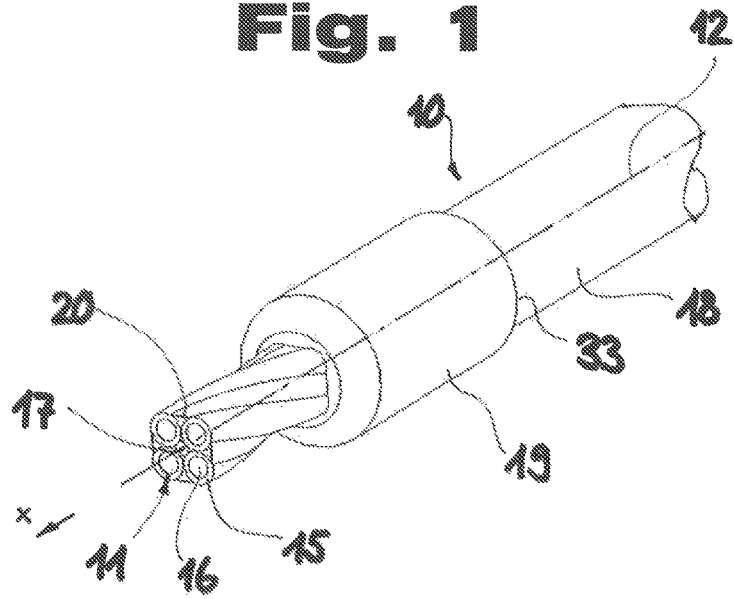
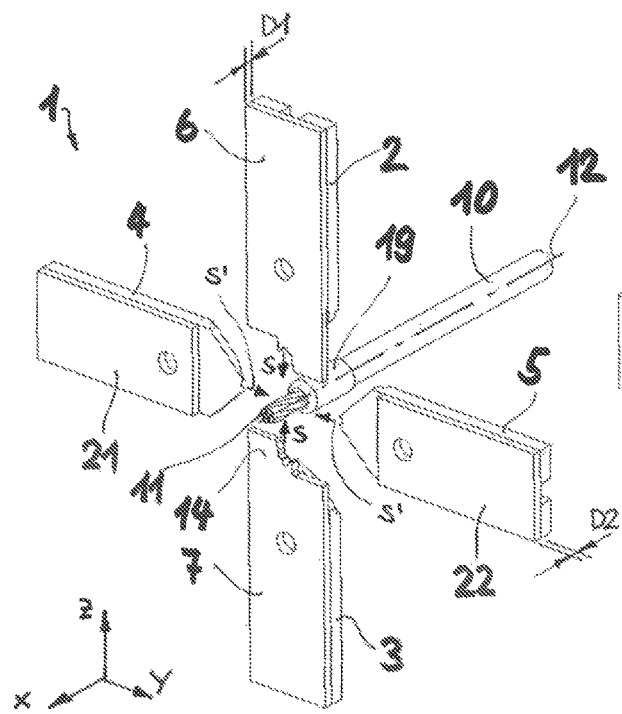
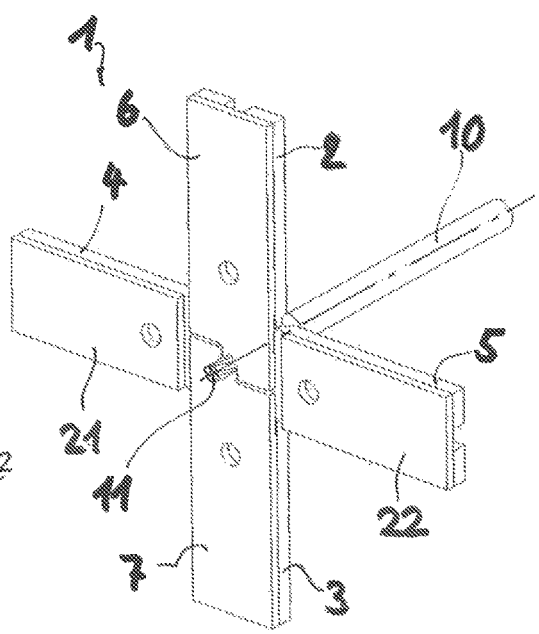

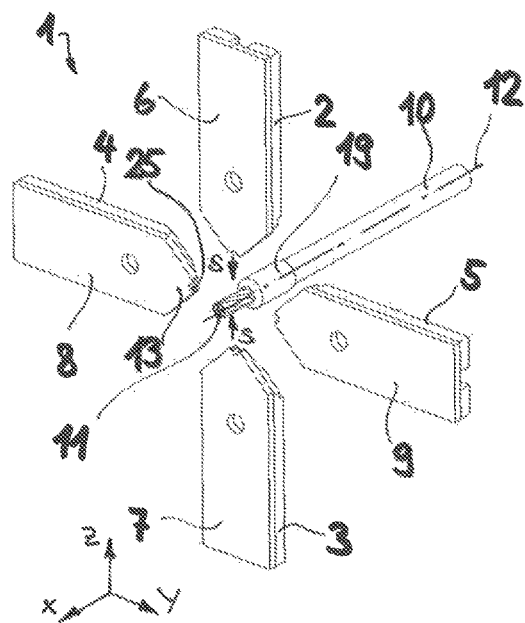
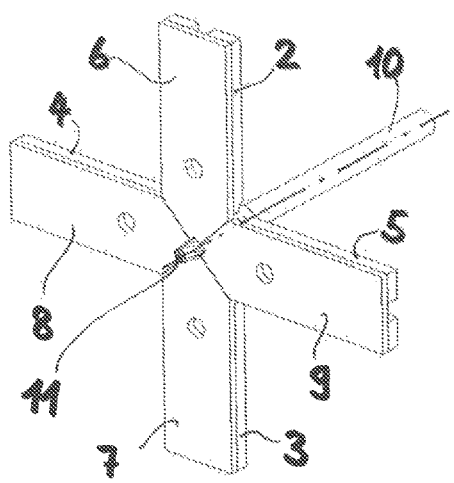
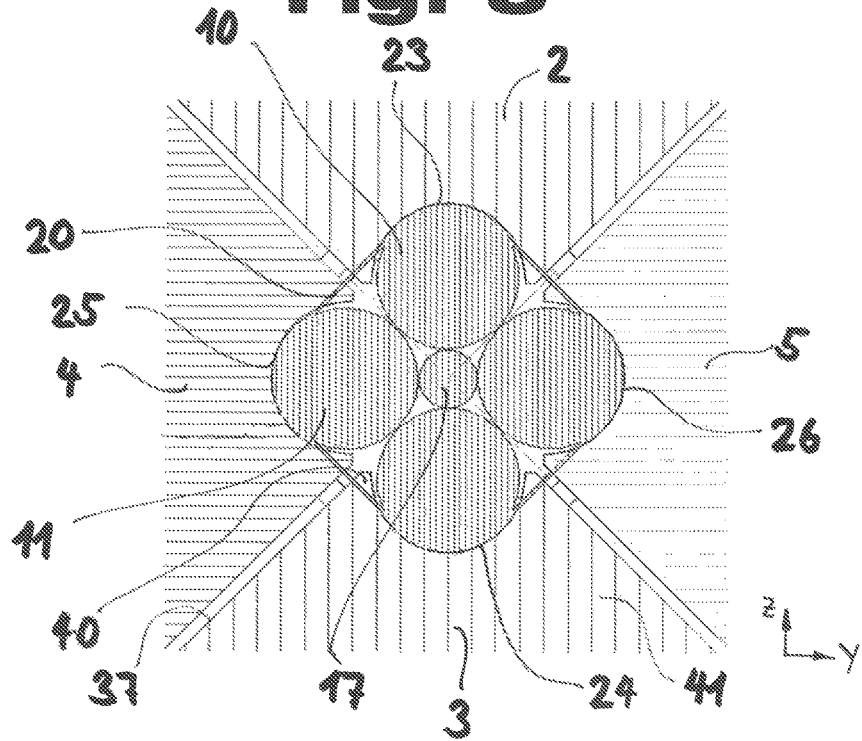

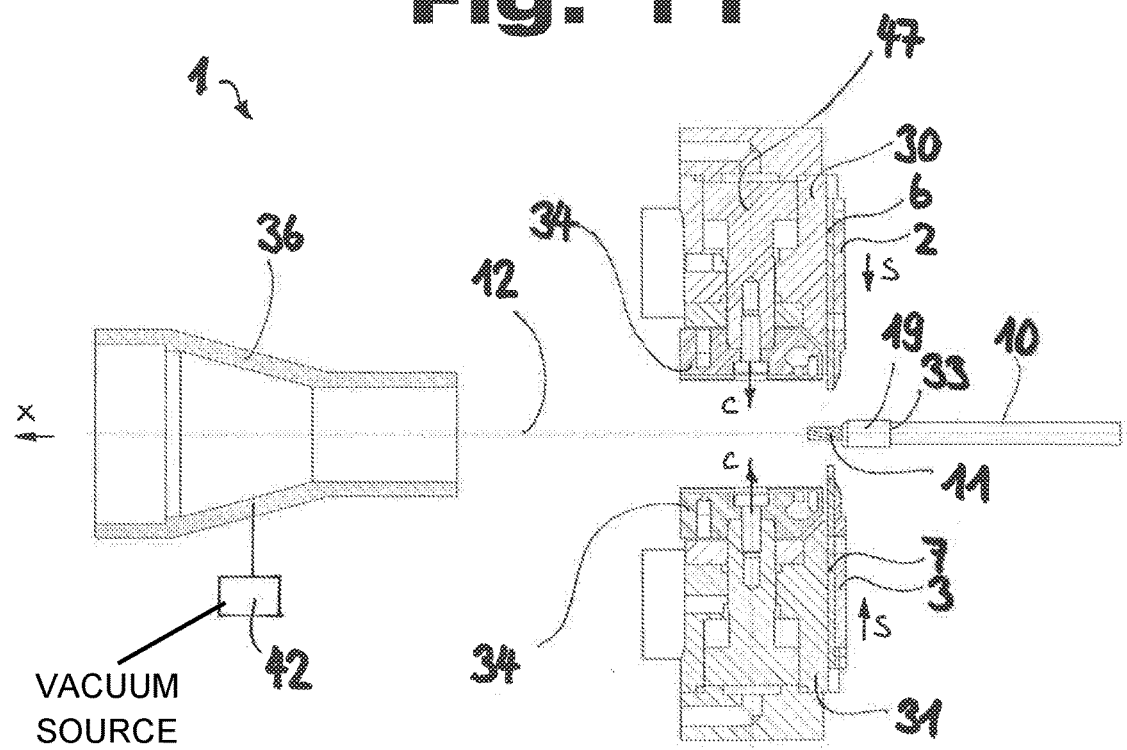
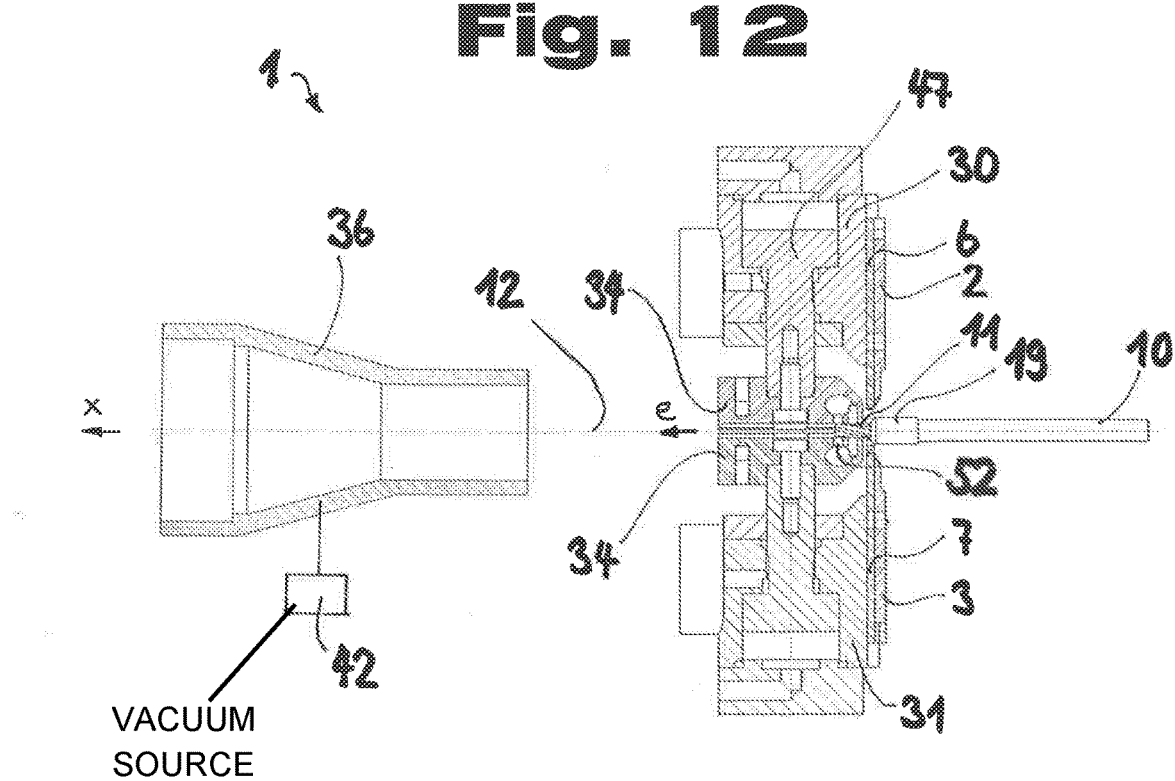

CABLE PROCESSING EQUIPMENT AND METHOD FOR REMOVING A SCREENING FILM FROM A SCREENED MULTI-CORE ROUND CABLE

FIELD

The invention relates to cable processing equipment and to a method for removing a screening film from a screened multi-core round cable.

BACKGROUND

Multi-core round cables consist of circularly bundled and frequently twisted cable cores. The cable cores consist of a conductor, for example strands or wires, of electrically conductive material such as, for example, copper or aluminum and an insulation encasing the conductor. Screened multi-core round cables are used in large numbers as, for example, signal cables in cars or other motor vehicles. The signal cables have to be well screened electromagnetically so as to ensure a high level of data transmission quality and thus be able to avoid causing undesired disturbances in, for example, the on-board electronic system of the vehicles by electromagnetic waves radiated by the cables. In order to screen the round cable the cable cores are surrounded by a braided screening cover of a metallic electrically conductive material. For high demands on screening quality, screened cables additionally have a screening film which is arranged between cable cores and braided screening cover and surrounds the bundled cable cores. A screening film of that kind frequently consists of a plastics material film, for example of PET, to which an aluminum layer has been applied. The thickness of present-day screening films is approximate 0.3 millimeters. However, also known are screening films which consist completely of a metal such as, for example copper or aluminum. These screening films are also known as all-metal films. In order to protect the screened multi-core round cable a casing insulation of PVC or other electrically insulating resilient plastics material is frequently provided as external casing around the screening braided cover.

With respect to the fitting-out of multi-core screened round cables containing a screening film it can often be necessary for the screening film to have to be removed to expose cable core ends. In the past, the screening film was removed from such round cables in a laborious manual operation. Manual removal is complicated, cost-intensive and less efficient. Moreover, there is the risk of being able to damage the insulation of the cable cores.

SUMMARY

It is accordingly an object of the present invention to create cable processing equipment, which can be operated simply and efficiently, for removal of a screening film from a screened multi-core round cable. The cable processing equipment shall be designed in such a way that undesired damage of the insulations of cable cores cannot arise during removal of the screening film.

According to the invention this object is fulfilled by cable processing equipment for removal of a screening film from a screened multi-core round cable that comprises a plurality of knives for cutting into the screening film and guide elements. Each knife is associated with a respective cable core of the round cable. In that case, at least a part of the knives is provided with a respective one of the said guide elements. The aforesaid at least a part of the knives refers to the number of knives present. Thus, if the cable processing equipment has overall a total number of knives for cutting into the screening film and thus forms a group of knives, then at least one knife from the group of knives (or a sub-quantity of the total number knives) would have to be provided with a guide element. The knives and, in particular, the knives provided with the guide elements are movable radially relative to the round cable between an open setting and a closed setting and in the closed setting can cut into or possibly cut through the screening film. The knives respectively have concavely formed cutting edges. The cutting edge shape is advantageously adapted to the cable cores, as a result of which the thin screening film, which can have, for example, a film thickness of 0.3 millimeters, can be uniformly cut into regionally. The guide elements have guide sections in which the cable cores encased by the screening film are receivable, at least regionally, in the closed setting. In that case the guide sections can form an abutment surface for the cable cores encased by the screening film, by way of which surface the cable cores encased by the screening film come into contact with the guide elements in the closed setting.

Due to the fact that the knife and the associated guide element at least in the closed setting protrude in such a way relative to the guide section that a projection length for fixing a maximum depth of incision is defined, it can be ensured that with respect to removal of the screening film only the screening film is weakened by cutting processes. The mentioned projection length is in that case usually measured in the region of a crest of the concavely formed cutting edge. Damage to the cable cores can be virtually excluded. The cable processing equipment can be operated simply and reliably.

The projection length is advantageously adapted to the thickness of the screening film. For most cases of use the projection length should amount to at most the film thickness. For current screening films in which the film thickness is approximately 0.3 millimeters, the knife in the closed setting can protrude by a projection length of between 0.05 and 0.3 millimeters relative to the guide section of the respective guide element. For specific purposes of use, for example in the case of screening films with a high degree of elasticity, even projection lengths which are slightly larger than the film thickness would be conceivable.

The knife can be fixedly connected with the guide element, in which case the knife protrudes relative to the guide element by the projection length not only in the closed setting, but also in the open setting. However, it would also be conceivable to mount the knife on the guide element to be capable of limited displacement. In this case the knife would completely protrude only in the closed setting.

When, in particular, the round cable has round cable cores, it can be advantageous if the guide section of the guide element forms a circularly cylindrical concave abutment surface for the cable cores encased by the screening film. In order that the cable core or at least the comparatively soft material of the insulation of the cable core can be compressed during the closing process it can be advantageous to select an appropriately matched abutment surface.

The guide element can be a component made from a metal plate. A plate-shaped guide element (also termed "guide plate" in the following) can be installed in the cable processing equipment in simple manner, in that, for example, the guide plate together with the associated knife is attached to a knife mount. It is possible to use, for example, steel plates to make guide plates.

The knives can also be formed to be plate-shaped. If guide elements and knives are respectively formed to be plate-shaped, compact cutting units with a multi-layered layer construction can be created.

It can be advantageous if each knife has a guide element. It can thus be ensured that the screening film is always cut into within a permissible value and thus the insulation of the cable cores is not damaged.

However, in the alternative it can also be advantageous if only a part of the knives has guide elements and the remaining knives have cutting edges which are free. The last-mentioned, remaining knives thus do not have guide elements. Instead, these knives can be equipped with a spacer plate or other spacer element. The distance of the knife from, for example, a knife mount of the cable processing equipment can be preset in simple manner by such a spacer element. If the spacer element is a spacer plate, the spacer plate with the thickness D2 advantageously has same plate thickness as the guide plate with the thickness D1 (i.e. D1=D2), in which case it is ensured that the screening film is cut into in the same axial position with respect to the longitudinal axis of the cable.

The knives can each be designed as follows: The knife can have a front end which faces the round cable and is wedge-shaped in a plan view. In that case, the cutting edge can be arranged in the region of the wedge tip of the knife having a wedge shape in plan view. Obviously, in accordance with this embodiment the wedge tip in plan view is formed by the concavely shaped cutting edge. Thus, a singular tip as such is not in fact present. By virtue of the wedge shape, the knives can be arranged in simple manner in star shape about the machine axis predetermined by the cable.

The knife can have a cutting edge adjoined by a groove section. In order to produce an advantageous cutting geometry the groove section can be a groove section extending in radial direction or in a cutting direction predetermined by the movement of the knife. In order to form a cutting wedge the knife can have a chamfer in which case the groove section is preferably arranged in the chamfer.

Elevations or points, which are tapered at an acute angle, for perforating the screening film can be arranged at the sides of the cutting edge. The lateral arrangement of the points for perforating the screening film in that case refers to the plan view mentioned in the preceding, in which the viewing direction is in cable longitudinal direction (or along an x axis). A knife having a cutting edge of that kind can thus locally perforate the screening film, for example if the screening film in the transition region between two cable cores does not bear areally against the cable cores and in certain circumstances is freely stretched. Thanks to the guide elements it can be ensured, as before, that the screening film is only incised between these perforation points.

If the cable to be processed is a screened four-core round cable with four cable cores it can be advantageous if four knives for cutting into the screening film are provided. Each knife is in that case associated with a respective cable core. The four knives can be combined in pairs and respectively movable relative to one another. The two knife pairs can have in plan view a cruciform arrangement with knives oriented at right angles to one another.

The cable processing equipment can comprise a knife head with knife mounts for mounting the knives, in which case advantageously a respective knife mount can be provided for each knife.

With particular advantage the knives are attachable or attached to the knife mounts in such a way that the guide elements or optionally the spacer plates are arranged between the knives and the knife mounts. The guide elements or the spacer plates can thus be received in sandwich-like manner between the knife mounts and the knives.

Moreover, it can be advantageous if the knife head has two mutually opposite knife mounts which, for example, are equipped with pneumatically drivable and/or motor-drivable stripping jaws for pulling off the incised screening film. The stripping jaws can be moved towards the round cable and fix, by clamping, the cable end of the round cable in the region of the incised screening film. Through movement of the stripping jaws axially with respect to the round cable the incised screening film can be completely detached from the rest of the screening film remaining at the round cable.

In certain cases the piece of screening film detached from the round cable with the help of the stripping jaws has to be extracted from the cable processing equipment. For that purpose, the cable processing equipment can have a suction pipe for sucking away the pulled-off screening film.

A further aspect of the invention relates to a method for removal of a screening film from a screened multi-core round cable. In that case the method is preferably carried out with use of the cable processing equipment described in the foregoing. The method is distinguished by the fact that the knives are moved radially towards the round cable so that in a closed setting the screening film is cut into or cut through by the knives. Due to the fact that at least one of the knives protrudes by a projection length relative to a guide section of a guide element, a maximum cutting depth can be fixed. The method can be automated in simple manner and performed by corresponding cable processing equipment.

DESCRIPTION OF THE DRAWINGS

Further individual features and advantages of the invention are evident from the following description of embodiments and from the drawings, in which:

FIG. 1 shows a perspective illustration of a screened four-core round cable;

FIG. 2 shows a perspective illustration of an arrangement with four knives in an open setting for cable processing equipment for removal of the screening film from the screened four-core round cable according to FIG. 1;

FIG. 3 shows the arrangement of FIG. 2 in a closed setting;

FIG. 4 shows an alternative arrangement with four knives in an open setting;

FIG. 5 shows the arrangement according to FIG. 4 in the closed setting;

FIG. 8 shows a cross-sectional illustration, to substantially enlarged scale, through the knives in the closed setting;

FIG. 11 shows a longitudinal section through two cutting units after the end of the cutting-into process and with stripping jaws in a rest setting; and FIG. 12 shows the stripping jaws of the two cutting units of FIG. 11 in a closed setting.

DETAILED DESCRIPTION

Figure 6:
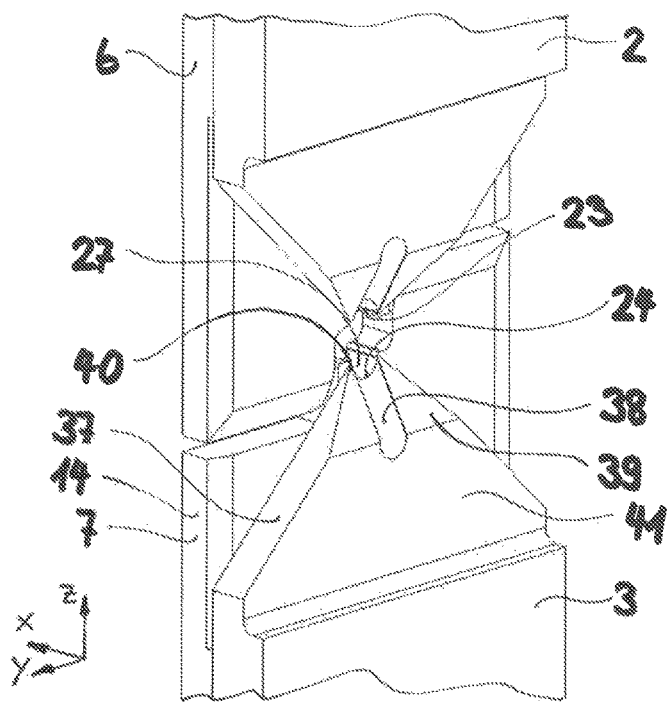
FIG. 6 shows a perspective view of a knife pair of the embodiment according to FIG. 3 from the front.

FIG. 1 shows the cable ends of a screened four-core round cable 10. The four cable cores of the screened round cable 10 are denoted by 11, wherein each cable core comprises a respective conductor 16 and an insulation 15 encasing the conductor. The conductors 16 are usually strands or wires of electrically conductive metallic material such as, for example, copper or aluminum. The cable cores 11 are circularly bundled and twisted about a filler 17, which is circular in cross-section, of an insulating material. The filler 17 can also consist of textile fibers. In addition, the round cable 10 can have a metal wire in the center. The round cable 10 is protected towards the outside by a casing insulation 18 of PVC or other electrically insulating elastic plastics material relative to weather influences and other external influences. For electrical screening, the round cable 10 has a braided screening cover 19 of an electrically conductive material and a screening film 20. The screening film 20 consists of, for example, a plastics material film, for example PET, to which an aluminum layer is applied. However, use can also be made of entirely metal films, consisting of copper or aluminum, as screening films 20. Such cables 10 are employed as, for example, signal cables in cars or other motor vehicles. The thickness of usual screening films is approximately 0.3 millimeters. Depending on the respective field of use and demands on the screening it is obviously also possible to process other screening films and, in particular, such with different film thicknesses by the cable processing equipment according to the invention as described in the following.

For the present fitting-out, which is not described in more detail, of the screened round cable 10, in which the core ends are fitted with, for example, crimp connections, it is necessary to remove the screening film 20 at one end. In order for the screening film 20 to be able to be removed, the screening film initially has to be exposed. For this purpose, the front piece of the cable insulation 18 is removed and the braided screening cover 19 folded over. A round cable 10 made ready in that way for the method, which is described in detail in the following, for removing the screening film 20 as illustrated in FIG. 1. The front edge, which faces rearwardly after turning over, of the folded-over braided screening cover 19 is denoted by 33. However, instead of being turned over the braided screening cover 19 could also be separated by cutting and thus the cable end exposed. The round cable 10 extends in axial direction signified by the arrow x and the cable longitudinal axis is denoted by 12. For the sake of better understanding and orientation a Cartesian co-ordinate system is illustrated at least partly in the following figures. In the figures concerned the cable longitudinal axis 12 of the round cable 10 always runs in the direction of the x axis. In the following FIGS. 2 to 12 it is shown how the screening film can be removed from the cable.

FIG. 2 shows an arrangement with four knives 2, 3, 4, 5 for cable processing equipment 1 for removal of the screening film from the screened four-core round cable 10. The screened round cable 10 is withdrawn by means of, for example, a cable gripper (not illustrated) in the direction of the x axis as far as a desired length position and brought by rotation of the cable gripper into the correct angular position in order to align the cable cores 11 with respect to the knives 2, 3, 4, 5. Each knife 2, 3, 4, 5 is associated with a respective cable core 11 of the round cable 10; the knives 2, 3, 4, 5 are aligned in the cutting position x with the respective cable cores 11 and can cut or cut into the screening film at the respective cable cores 11 in a cutting process. Guide plates 6 and 7 are mounted at the mutually opposite knives 2 and 3 which, for cutting into the screening film, are movable in radial direction towards the round cable 10. The direction of movement of the knives 2, 3 for achieving the closed setting is indicated by arrows s. The two knives 4, 5 extend in a direction at right angles to the knives 2, 3. The closing movement with respect to the knives 4, 5 is indicated by arrows s'. A star-shaped configuration thus results. In the present embodiment the four knives 2, 3, 4, 5 are, as apparent, disposed in a cruciform arrangement. The knives 4, 5 are provided with respective spacer plates 21, 22. The plate-shaped elements 6, 7 on the one hand as well as the plate-shaped elements 21, 22 on the other hand have the same thickness, as a result of which it is ensured that the positions of the cuts have the same x position for all knives.

Starting from the open setting according to FIG. 2 the individual knives 2, 3, 4, 5 can be simultaneously moved towards the round cable 10. However, a two-stage mode of operation could also be advantageous. Thus, for example, initially the knives 2, 3 could be moved together with the associated guide plates 6, 7 in s direction and the screening film in that case cut into in the region of the respective cable cores 11. The two remaining knives 4, 5 are thereafter moved in s' direction so as to cut into the remaining cable cores 11.

The spacer plates 21, 22 ensure that the screening film is cut into in the same axial position with respect to the longitudinal axis x of the round cable 10. For that reason, the plate thicknesses of the spacer plates 21, 22 (thickness D2) and the guide plates 6, 7 (thickness D1) are of the same size (i.e. D1=D2).

In FIG. 3 the knives 2, 3, 4, 5 together with the respective guide plates 6, 7 or spacer plates 21, 22 are disposed in a closed setting. The guide plate 6 can, for example, be fixedly connected with the knife 2 by way of a screw connection. Equally, the guide plate 7 can be fixedly connected with the knife 3. Instead of the fixed connection between knives and guide plates or spacer plates the respective components could also be mounted to be capable of a limited displacement by a projection length (t); with respect to projection length t, cf. the following FIG. 7. Similarly a fixed connection is present between the spacer plate 21 and the knife 4 as well as the spacer plate 22 and the knife 5.

In the second embodiment for an arrangement for cable processing equipment for removal of a screening film from the screened four-core round cable 10, which is shown in FIGS. 4 and 5, the plate-shaped components 6, 7, 8, 9 fastened to the knives 2, 3, 4, 5 are of identical construction. Each of the knives 2, 3, 4, 5 is provided with a guide plate 6, 7, 8, 9. The guide plates 6, 7, 8, 9 have front ends 13 (FIG. 4) which are wedge-shaped with respect to the plan view (viewing direction along the x axis) and face the round cable 10. The wedge-shaped ends 13 impart the form of an equilateral triangle, in which case the wedge includes a 45° angle. A guide section 25 formed by a concave surface is arranged in the region of the wedge tip. This guide section 25 forms an abutment surface for the cable cores 11 encased by the screening film 20.

In the closed setting shown in FIG. 5 the respective guide elements 6, 7, 8, 9 contact the respectively associated cable cores 11 encased by the screening film 20. For cable cores 11 with a round cross-section the concave abutment surface of the guide section 25 is formed to be substantially circularly cylindrical. In the closed setting, the guide sections 25 rest against the cable cores 11 over an area and can compress these during the closing process. The cable cores 11 can be compressed to a selectable degree by activation of the drive means (not illustrated here) for moving the knives together with the guide plates.

In the present case the knives 2, 3, 4, 5 are formed as knife plates and can be produced from, for example, a steel alloy suitable for cutting. However, ceramic materials would also be conceivable. The similarly plate-shaped guide plates 6, 7, 8, 9 are shaped similarly to the knives with respect to the external profile, whereby compact cutting units with a multi-layered layer construction are created. The guide plate 6, 7, 8, 9 is a component which can be made in simple manner from a metal plate (for example from steel). The knives 2, 3, 4 and 5 and associated guide plates 6, 7, 8, 9 respectively form four cutting units. The knives 2, 3, 4, 5 together with associated guide plates 6, 7, 8, 9 are in that case fixedly connected together by way of screw-fastening means or other fastening means.

A detail view of two mutually opposite cutting units with a knife pair movable in opposite sense along the z axis and comprising the knives 2 and 3 is illustrated in FIG. 6. The upper knife 2 and the opposite, lower knife 3 are of the same form. The guide plates 6, 7 fastened to the knives 2, 3 have front ends 14 which are stepped. The steps of the mutually facing ends 14 of the guide plates 6 and 7 are formed to be complementary with one another so that in the closed setting they are receivable one in the other in almost interlocking manner up to the point of a small gap (cf. the following FIG. 7). The knives 2, 3 for cutting into the screening film (not illustrated here) of the round cable have concavely formed cutting edges. The cutting edge, which is denoted by 24, of the lower knife 3 is associated with a lower cable core (not illustrated). The cutting edge of the upper knife 2 for cutting into the cable core which is upper in the cutting position x is denoted by 23. The cutting edges 23, 24 of each knife 2, 3 are formed to be circular in plan view (viewing direction in x direction) and matched to the cable cores. Reference is made to the following FIG. 8 with respect to details concerning cutting edge geometry.

As is evident from FIG. 6, the knives 2, 3 have a wedge-shaped front end 41. The curved cutting edge 24 defines the tip of the wedge of the front end 41 of the wedge-shaped knife 3. The knife 3 has a chamfer 39 (cf. cross-sectional illustrations according to the following FIGS. 11, 12) inclined by a cutting-edge angle of approximately 30° relative to a knife lower side lying planoparallelly with respect to the y-z plane. A channel-like groove section 38 extending in radial direction and forming the curved cutting edge 24 is arranged in the chamfer 39.

The form of the front ends 41 of the knives as shown in FIG. 6 otherwise also corresponds with the knives as used for the second embodiment according to FIGS. 4 and 5. In the first embodiment, not only the knives 2, 3, but also the guide plates 6, 7 have wedge-shaped front ends.

Figure 7:
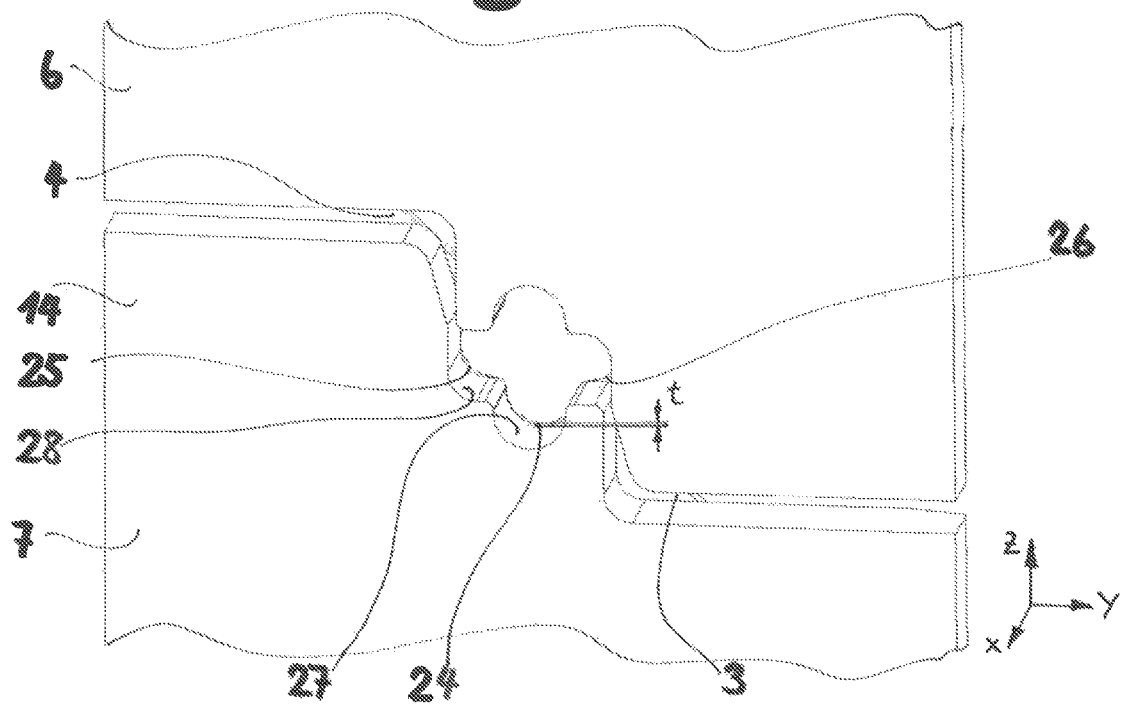
FIG. 7 shows the knife pair of FIG. 6 in a rear view to substantially enlarged scale.

It is apparent from the rear view of the knife pair shown in FIG. 7 that the individual cutting units are designed so that in each instance only a narrow cutting edge 24 of a knife 3 protrudes beyond the profile of the associated guide plate 7. The lower knife 3 with the cutting edge 24 protrudes in the region of the crest of the profile relative to the guide section 27 of the guide plate 7 by a projection length t. This projection t can be selected or set in dependence on the insulation material of the inner conductor and the material and thickness of the screening film such that the screening film can be cut or scored or cut into without giving rise to residual damage of the insulation material. For current screened four-core round cable this projection length t is between 0.05 millimeters and 0.3 millimeters (up to the maximum thickness of the screening film). However, other dimensions for the projection t would also be conceivable depending on the respective screening film.

In addition, the cutting edges of the knives movable in horizontal direction or along the y axis are shown in FIG. 7 and are recognizable due to the substantially increased scale. The cutting edge 25 of the knife 4 protrudes relative to a second guide section 28 present on the guide plate 7. This guide section 28 and the cutting edge 25 are associated with an adjacent cable core. The third cutting edge 26 of the knife opposite the knife 4 is similarly evident in FIG. 7.

The guide sections 27 of the guide plates 6, 7 are shaped so that the guide plates 6, 7 during closing slightly rotate the round cable, by engagement in the cable cores, in the case of a not entirely exact angular position and can thus provide compensation for at least slightly incorrect positions of the cable. Due to their shape the guide plates 6, 7 press and bias the screening film close to the cable cores in that the screening film is drawn into the empty space between the cable cores.

FIG. 8 shows a cross-section through the arrangement with the four knives 2, 3, 4, 5 according to FIG. 3 or 5 in closed setting. The cores 11 of the round cable are illustrated in cross-section in simplified form as circular discs, but obviously these cores 11 also have conductor and insulation. Each cable core 11 is associated with a cutting edge of a knife. All knives 2, 3, 4, 5 have an identical shape and cutting edge geometry, for which reason reference is made in the following by way of example to the lower knife 3 for all four knives. The cutting edge 24 of the lower knife 3 has in cross-section an approximately circular form. The cutting edge shape of the cutting edge 24 is adapted to the lower cable core 11. In the closed setting, in which the screening film 20 is cut into, the cutting edge 24 rests—up to a residual value, which corresponds with the difference of the film thickness from the projection length—on the cable core 11. Arranged laterally of the cutting edge 24 are points 40 at the side edges 37, which arise as a consequence of the wedge shape of the front end 41 of the knife 3. If, as shown by way of example in FIG. 8, the screening film is exposed in the transition region between the cable cores, then the points 40 perforate the screening film 20 in the closing process.

Figure 9:
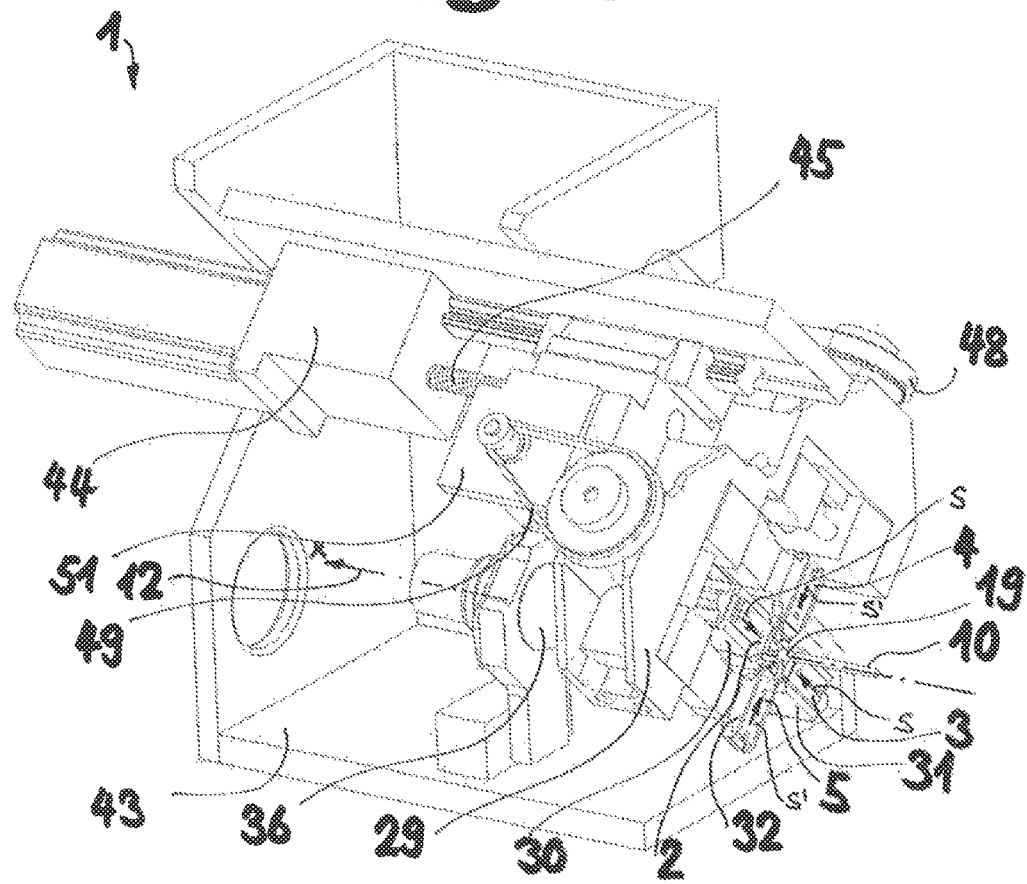
FIG. 9 shows cable processing equipment for removal of a screening film from a screened four-core cable with a knife arrangement in the form of FIG. 4.
Figure 10:
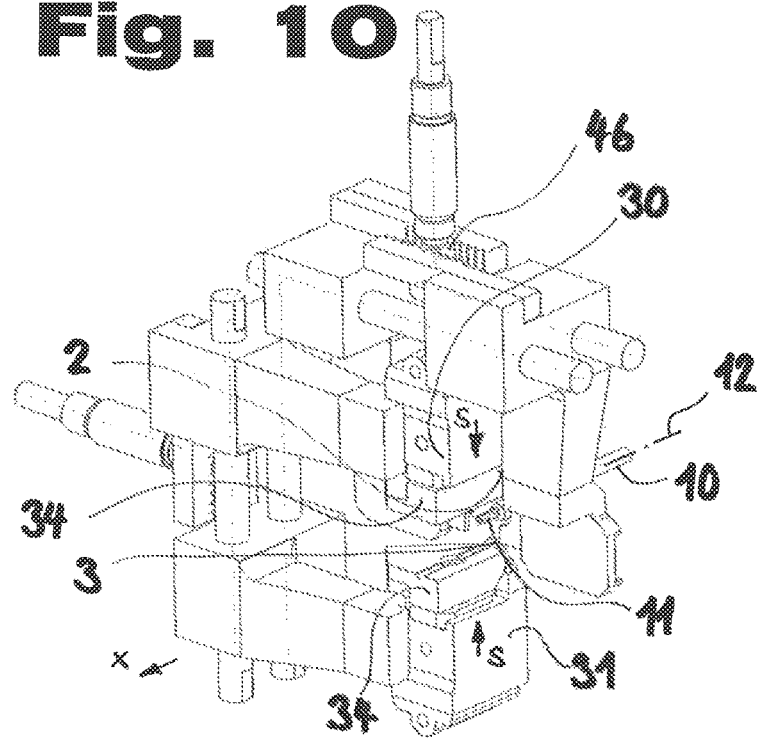
FIG. 10 shows a part of the knife head of the cable processing equipment according to FIG. 9 in a perspective illustration to slightly enlarged scale.

Constructional details with respect to the design of cable processing equipment for removal of a screening film from a screened four-core round cable are evident from FIGS. 9 and 10. FIG. 9 shows cable processing equipment 1 with a knife arrangement in the form of the second embodiment according to FIGS. 4 and 5. The cable processing equipment 1 comprises a bracket 43 for supporting the machine components. The knives 2, 3, 4, 5 as well as the associated guide plates are arranged at a knife head 29 by way of knife mounts. The knife head 29 is reciprocatingly displaceable along the cable longitudinal axis 12 or in x direction by way of a servo-axis 44 with a spindle drive comprising a spindle 45. Other drive solutions for moving the entire knife head 29 would obviously also be conceivable in place of the spindle drive. Further drives are provided for moving the knives 2, 3 as well as 4, 5 in radial direction relative to the screened round cable 10. The knives 4, 5 can, for example, operate by way of a transmission on activation of a belt 49 of a motor 51 of a second drive with the knife pair 4, 5. The corresponding closing movement is indicated by arrows s'. Serving for movement of the knives 2, 3 is a third drive which by way of belt 48 produces the movement of the knives 2, 3 in the direction of the arrows s. A cable gripper which can be part of a manual work station or a cable processing installation and which holds the screened multi-core round cable 10 during processing is not illustrated.

A part of the knife head 29 of the cable processing equipment 1 of FIG. 9 is illustrated in FIG. 10. This part of the knife head 29 has the knife pair with the knives 2 and 3, which serve in opposite sense in closing direction s for producing the closed setting for cutting into the screening film laid around the cable cores 11. A rack transmission, which by means of driven belt 48 provides the movement of the two mutually opposite cutting units with the knives 2, 3, is denoted by 46. Each knife 2, 3 together with the associated guide plates is mounted by a respective knife mount 30, 31. The knife mounts 30, 31 can be moved by way of the rack transmission 46 in common in radial direction relative to the cable longitudinal axis 12. Each knife mount 30, 31 additionally comprises a respective stripping jaw 34 for pulling off the incised screening film.

In FIG. 11 the knife mounts 30 and 31 are in the open setting with respect to the radial position. With respect to the axial position, the knives 30, 31 are disposed in a somewhat forwardly displaced position in which incised screening film of the screened round cable 10 can be pulled off. For drawing off the screening film, the stripping jaws 34 have to be moved towards the cable longitudinal axis 12 and brought into clamping contact with the screening film. The stripping jaws 34 are connected with a pneumatic cylinder 47 and can be pneumatically moved out of the knife mounts 30, 31. The pneumatically produced outward movement of the stripping jaws 34 is indicated by arrows c. Due to the comparatively small stroke of the pneumatic drive for moving the stripping jaws 34 it is usually necessary to move the knife mounts 30, 31 entirely towards the cable longitudinal axis 12. The last-mentioned movement is indicated in FIG. 11 by the arrows s.

In FIG. 12 the stripping jaws 34 are in a closed setting in which they grip the cable cores 11 by clamping. Through movement of the arrangement with the knife mounts 30, 31 and stripping jaws 34 in the direction of the arrow e with the round cable 10 stationary the incised screening film can finally be pulled off. Alternatively or possibly even additionally, it would also be conceivable to move the round cable 10 in opposite direction to the arrow e, for example, by means of a cable gripper (not illustrated).

A suction pipe 36 is additionally shown in FIG. 11. The suction pipe 36 serves the purpose of removing from the machine the film piece of the screening film pulled off, after the incision, by means of the stripping jaws 34 forming a stripping gripper. A vacuum source 42 serves for producing a suction flow.

The method for removing the screening film from a screened multi-core round cable 10 is described in detail in the following. The screened multi-core round cable has to have already been prepared in upstream steps, which are not explained here, but which are known as such to the expert, to such an extent that the casing insulation 18 at the cable end is already removed and the braided screening cover 19 either cut off or folded over. In addition, the round cable 10 is in the correct angular position so that respective guides of the guide elements 6 to 9 can receive the cable cores 11. Monitoring is carried out by means of, for example, an optical detection device (not illustrated) as to whether the cable cores are in the correct angular position. The round cable can be brought into the correct angular position by means of a cable gripper (not illustrated) through appropriate rotation.

Thereafter, the method for removal of the screening film from the screened round cable 10 takes place as follows: The open knife head 29 travels over the round cable 10 to the desired cutting position x in which the screening film 20 is to be cut into. The two mutually opposite knife mounts 30, 31 as well as the similarly mutually opposite knife mounts 32 close to a value, which is stored in a processor (not illustrated) of a control unit, for the radial position of the knives in the closed setting. During the closing process the angular position can possibly be slightly corrected by the shaped elements. The screening film is pressed by the respective shaped sections of the shaped elements against the cable cores 11, the cable is compressed and at the same time the screening film is cut or scored or cut into. The result of the cutting into is, apart from the geometric conditions predetermined by the cutting, also dependent on how strongly the cable cores are compressed by the guide plates. This compression can be set in programmable manner by the drives of the knife head. The control also makes it possible when required to initially close a first cutting arrangement with the knife pair of the knife mounts 30, 31 combined in paired manner and thereafter the second cutting arrangement with the further knife pair of the knife mounts 32 (cf. FIG. 9).

After the end of the cutting process the knife mounts 30, 31, 32 entirely open and the knife head 29 moves slightly forwardly (cf. FIG. 11) so as to be able to optimally grip the cut or incised screening film. The pulling-off jaws 34 are pneumatically moved out, in which case they still do not contact the screening film in completely moved-out position. Thereafter the knife mounts 30, 31 are moved in closing direction so as to clamp the cut-into screening film. Additionally or possibly even alternatively to clamping, a vacuum can be applied to the screening film by the stripping jaws 34 so as to make the pulling-off efficient. The screening film can be sucked up by way of suction channels 52 created by bores and thus temporarily fixed to the stripping jaws. The knife head 29 thereafter moves back along the x axis, whereby the screening film is separated, after which the separated piece of screening film is brought into the vicinity of the suction pipe 36, by which it can finally be sucked away and thus removed from the cable processing equipment 1.

The embodiments described in the foregoing are oriented towards processing a screened four-core cable 10 in the form of the cable shown in FIG. 1. The cable processing equipment 1 according to the invention is fundamentally also suitable for other screened multi-core round cables. Thus, the round cables can be equipped with a filler or also not equipped with a filler and optionally also not with a braided screening cover. If, for example, the screened round cable has three cable cores, then the cable processing equipment would have three knives respectively associated with the cable cores (as well as guide plates associated with the knives), which would be arranged around the cable in the configuration of a three-pointed star. The appropriately adapted cable processing equipment could also be advantageous for five-core screened round cables or screened round cables with an even higher number of cores.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A cable processing equipment for removal of a screening film from a screened multi-core round cable, comprising:
   a plurality of knives movable radially relative to the round cable between an open setting and a closed setting for cutting into the screening film, wherein each of the knives is associated with a respective cable core of the round cable and wherein the knives have concavely formed cutting edges; and a plurality of guide elements with guide sections in which in the closed setting the cable cores encased by the screening film are receivable at least regionally, wherein at least two of the knives are provided with an associated one of the guide elements and wherein at least in the closed setting each of the at least two knives protrudes beyond the associated one of the guide elements by a projection length relative to the guide section.

2. The cable processing equipment according to claim 1 wherein each of the at least two knives at least in the closed setting protrudes relative to the guide section of the associated guide element by the projection length between 0.05 millimeters and 0.3 millimeters.

3. The cable processing equipment according to claim 1 wherein the guide sections of the guide elements form a circularly cylindrical concave abutment surface for the cable cores encased by the screening film.

4. The cable processing equipment according to claim 1 wherein each of the guide elements is formed by a component made from a metal plate.

5. The cable processing equipment according to claim 1 wherein each of the knives is provided with one of the guide elements.

6. The cable processing equipment according to claim 1 wherein other ones of the knives have exposed cutting edges.

7. The cable processing equipment according to claim 1 wherein each of the knives has a wedge-shaped front end facing the round cable and each of the cutting edges is arranged at a tip of the wedge-shaped front end.

8. The cable processing equipment according to claim 1 including a groove section formed in the wedge-shaped front end adjoining the cutting edge.

9. The cable processing equipment according to claim 1 including points, which taper at an acute angle, for perforating the screening film are arranged laterally of the cutting edges.

10. The cable processing equipment according to claim 1 wherein the round cable has four cable cores the plurality of knives is four knives for cutting into the screening film.

11. The cable processing equipment according to claim 1 including a knife head with knife mounts mounting the knives.

12. The cable processing equipment according to claim 11 wherein the knife head has two mutually opposite one of the knife mounts equipped with stripping jaws for pulling off incised screening film from the round cable.

13. The cable processing equipment according to claim 1 including a suction pipe for sucking away incised screening film from the round cable.

14. A method for removing a screening film from a screened multi-core round cable comprising the steps of:
providing cable processing equipment having a plurality of knives movable radially relative to the round cable between an open setting and a closed setting for cutting into the screening film, wherein each of the knives is associated with a respective cable core of the round cable and wherein the knives have concavely formed cutting edges, and having a plurality of guide elements with guide sections in which in the closed setting the cable cores encased by the screening film are receivable at least regionally, wherein at least two of the knives are provided with an associated one of the guide elements and wherein at least in the closed setting each of the at least two knives protrudes beyond the associated one of the guide elements by a projection length relative to the guide section;
arranging at least one of the knives to protrude by a projection length relative to the guide section of the guide element so that the projection length fixes a maximum incision depth; and
moving the knives radially towards the round cable to the closed setting so that the screening film is cut into by the knives.

* * * * *